United States Patent

Lüthi

[11] 4,130,205
[45] Dec. 19, 1978

[54] LOADING ARM

[75] Inventor: Hans Lüthi, Steffisburg, Switzerland

[73] Assignee: Fritz Studer AG., Thun, Switzerland

[21] Appl. No.: 748,499

[22] Filed: Dec. 8, 1976

[30] Foreign Application Priority Data

Dec. 9, 1975 [CH] Switzerland .................. 15959/75

[51] Int. Cl.² ............................................. F15B 15/26
[52] U.S. Cl. .................................. 214/1 BB; 92/24; 92/26; 92/165 R; 92/165 PR
[58] Field of Search .................. 214/1 BB, 1 BC, 141, 214/146.5, 1 B; 92/24, 26, 27, 28, 110, 117 R, 165 R, 165 PR, 177

[56] References Cited

U.S. PATENT DOCUMENTS

| 2,666,417 | 1/1954 | Harsch | 92/165 PR |
| 3,493,135 | 2/1970 | Novotny | 214/147 G |
| 3,575,301 | 4/1971 | Panissidi | 214/1 BC |
| 3,587,886 | 6/1971 | Gano | 214/141 |
| 3,734,303 | 5/1973 | Blatt | 214/1 BB |
| 3,863,545 | 2/1975 | Kesti | 92/24 X |
| 4,034,867 | 7/1977 | Akagawa | 92/165 PR X |

Primary Examiner—Albert J. Makay
Assistant Examiner—George F. Abraham
Attorney, Agent, or Firm—Ernest F. Marmorek

[57] ABSTRACT

A loading arm apparatus having a displaceable main shaft formed as a fluid operable cylinder with a fixed piston which may be clamped at any position along its displacement by a fluid operable clamping means operable against its wall. A guide rod placed in a common block with the main shaft can be clamped also by a separate clamp simultaneously with the main shaft. As a result, the main shaft can be mounted with a large play.

4 Claims, 5 Drawing Figures

LOADING ARM

FIELD OF THE INVENTION

The present invention relates to a loading arm, the main rod or shaft of which can be displaced along its longitudinal direction and thereby is capable by means of a gripping device secured to one of its ends, to move work pieces from one position to another.

BACKGROUND OF THE INVENTION

Such loading arms have been known and have been used in many areas of technology. They are usually equipped with a main shaft provided with a gripping device — the main shaft can be moved in the longitudinal direction by a pneumatic or hydraulic drive. Such main shaft or rod is prevented from rotation by a second rod which runs parallel to the main shaft and is in the form of a guide rod, or by means of a polygonal piece, which can be, for example, a triangular piece.

The known loading arms possess a number of considerable disadvantages. Despite the fact that they are equipped with a main shaft and a guide rod and even if they are constructed with an angular main rod, their accuracy in the end positions, that is, at the transfer position, is directly dependent from the accuracy of their bearings, and thereby from the play thereof. As a result of a lengthy operation in a contaminated environment, the known loading arms become exposed to a great deal of soiling. For this reason, in order to assure an easy motion and operation of the loading arm, their bearings are constructed with a relatively large play which then will result in an inaccurate positioning in the end positions and in the transfer positions.

A further disadvantage of the known loading arm is associated with the sealing of their moveable parts against soiling.

Loading arms having a main shaft and a guiding rod parallel to it must be equipped with a pair of sealing elements with a definite distance between them, while in the case of an angular guide rod, the sealing of the angular edges prevents considerable difficulties. Such sealing problems require a relatively large play in the guide elements of the loading arms if a reliable functioning is the prime requirement.

SUMMARY OF THE INVENTION

It is, therefore, an object of the present invention to provide a loading arm which is capable of performing the manipulation and moving of work pieces repeatedly at high accuracy between its end position and transfer position.

According to the present invention, the main rod in its end position, or transfer position, is clampable and accurately alignable while it is moving in its mounting or bearing during the displacement, with a relatively large play.

As a result of the clamping and accurate alignment of the loading arm in its end and transfer position, the range of application of the loading arm of the present invention has been considerably increased. For example, it becomes possible to employ the loading arm not only in transportation assignments, but also for the more complex problems of mounting or measuring work pieces. The relatively large play of the main shaft during the displacement movement makes it substantially safer in operation, in the event the bearing and mounting parts become soiled.

As the structural elements which perform the alignment of the main rod in its end positions or transfer positions, are placed in a space which is closed to the outside, their soiling and the resulting decrease in the positioning accuracy is reliably prevented.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
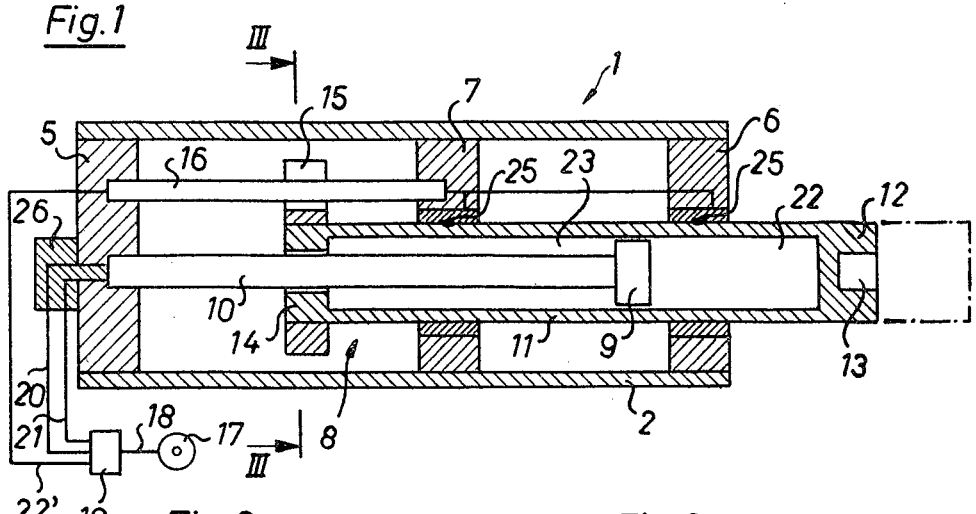
FIG. 1 is a longitudinal section through a schematically illustrated loading arm having a main shaft and a guiding rod parallel to it placed in a space closed to the environment.
Figure 2:
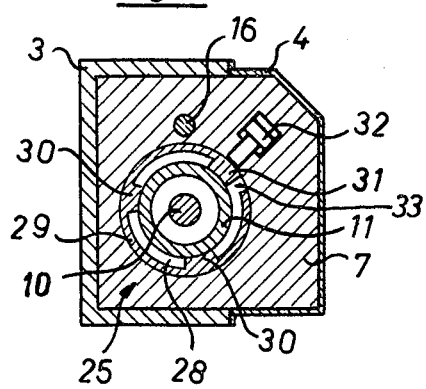
FIG. 2 is a cross-section through the loading arm according to FIG. 1, in the region of one of two mounting positions of the main shaft, for example, along the line II—II of FIG. 1.

With reference to FIG. 1, it is seen that the loading arm 1 has a closed housing 2 which, according to the showing of FIG. 2, includes a fixed frame profile 3 and a removable cover 4, as well as end walls 5, 6, between which an intermediate wall 7 is placed.

In the housing 2, a thrust piston fluid drive or a linear fluid motor 8, driven by a pressurized medium, is arranged, the piston 9 and the piston rod 10 of which are fixedly mounted in the housing 2, while the cylinder 11 is movably mounted in the housing 2. At the outer end 12 of the cylinder 11, means 13 are provided for receiving a gripping device or the like, the means 13 being only schematically illustrated. At the other end 14 of the cylinder 11, a guide block 15 is secured which cooperates, as hereinafter described, with a guide rod 16, fixed in the wall portions 5 and 7 of the housing 2.

The arrangement of the thrust piston drive 8 can be executed also with a fixed cylinder 11 and a movable piston 9 and piston rod 10. The moving part of the thrust piston drive 8, which at its outer end carries the gripping device, is for the purposes herein called a main shaft. Therefore, in FIG. 1, the cylinder 11 is the main shaft.

The thrust piston drive 8 is supplied from a source of pressurized medium 17. The pressurized medium is guided over a conduit 18 to a control device 19 to control the displacement and the operations of the main shaft 11 which is illustrated in the block diagram form only. From the control device 19, the pressurized medium according to the desired operation is guided through conduits 20, 21 through the piston rod 10, into the cylinder chambers 22, 23, formed by the piston 9 within the cylinder 11. From the control device 19, the pressurized medium is conducted over a further conduit 22' through the guide rod 16, mounting portions 25 in the walls 6 and 7, wherein each, a separate clamping arrangement can be provided. For the guiding of the conduits 20, 21, on the end wall 5, there is provided a guiding block 26.

FIG. 2 being a section through the intermediate wall 7, illustrates the area where one of the mounting portions 25 is arranged. In a bore 28, in the wall 7, a ring 29 is placed which is provided with a pair of fixed bearing surfaces. A third bearing surface 31, in the ring 29 made movable by an axial slot 33 in the ring 29, is pressed by means of a thrust piston drive 32, against the wall of the cylinder, that is, of the main shaft 11. As a result, the main shaft 11 becomes fixedly clamped, whereupon the position of the clamped main shaft 11 is determined through the bearing surface 30. The drive 32 is operable from source 17 through control device 19.

Figure 3:
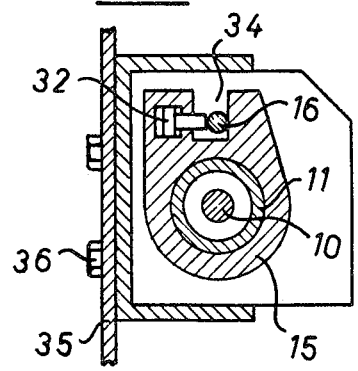
FIG. 3 is a cross-section through the loading arm of FIG. 1, in the region illustrating the cooperation of the guiding means of the main rod with the guide rod namely, along the line III—III of FIG. 1.

FIG. 3 illustrates a cross-section through the guide block 15 which is secured at the inner end 14 of the main shaft 11. The guide block 15 is provided with a recess 34 in which the guide rod 16 lies. With the help of a thrust piston drive 32 placed into the guide block 15, the main shaft 11 may become securely clamped in certain required positions. The drive 32 in the guide block 15 is operable from the source 17 through the control device 19. By the secure clamping, the main shaft 11 maybe accurately positioned repeatedly and in an unequivocal manner even with respect to transverse displacements or a rotation.

Figure 4:
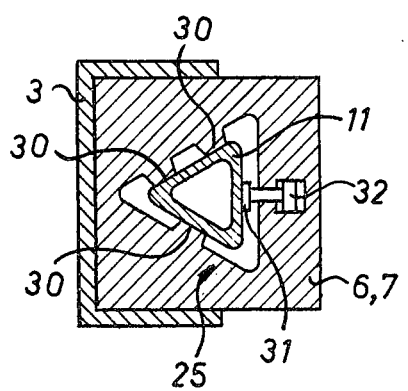
FIGS. 4 and 5 are cross-sections through a loading arm having a polygonal main shaft, the section being taken in the region of one of two mounting positions of the main shaft.
Figure 5:
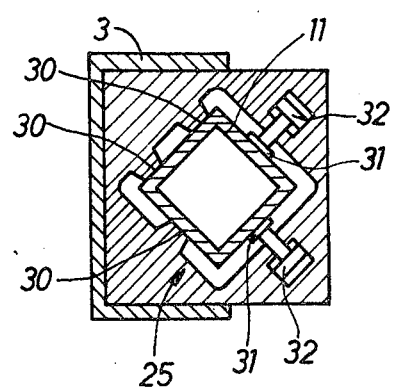

FIGS. 4 and 5 illustrate, similar to FIG. 2 a cross-section through one of the two mounting portions 25, wherein the main shaft 11 is constructed as a triangular or square pipe, respectively; otherwise the principles are the same as those of FIG. 1. Through the thrust piston drive or drives 32, the movable bearing surface 31 becomes pressed against the main shaft 11, whereupon after the main shaft 11 will bear against the fixed bearing surface 30, it becomes fixed in its position as well as in its direction. By using a polygonal main shaft 11, the guide block 15 and the guide rod 16 can be omitted.

As can be seen und understood from the foregoing description of the clamping means, the loading arm 1 can be applied to perform accurate positioning problems, as well as accurate measuring and mounting assignments. During the displacement movement, the main shaft 11 will run with a relatively large play in its mounting places 25, whereupon an abrasion and a jamming or blocking through dirt, which may enter the parts, is reliably prevented. As a result, the loading arm 1 can be employed under difficult environmental conditions and still retain its high positioning accuracy. The loading arm 1 may be mounted in any position, for example, it can be secured to a wall 35 by means of screws 36, as illustrated in FIG. 3. It is noted that in FIGS. 3 and 4, the cover 4 has been omitted.

I wish it to be understood that I do not desire to be limited to the exact details of construction shown and described, for obvious modifications will occur to a person skilled in the art.

Having thus described the invention, what I claim as new and desire to be secured by Letter Patent, is as follows:

1. A loading arm apparatus comprising a main rod, support means operable for supporting said rod displaceably along the longitudinal direction thereof, said rod including engaging means operative for engaging work pieces to transfer the same from one position to another, said support means comprising releasable clamping means operable for clamping and accurately aligning said main rod, and, respectively, releasing said main rod for displacement thereof along the longitudinal direction with play, wherein said main rod comprises piston drive means having a piston fixedly mounted in said housing, said main rod comprising a movable cylinder for said piston defining a pair of chambers, a source of pressurized medium for supplying pressurized fluid to said chambers selectively to displace said cylinder to predetermined distances along said longitudinal direction.

2. A loading arm apparatus comprising a main rod, support means operable for supporting said rod displaceably along the longitudinal direction thereof, said rod including engaging means operative for engaging work pieces to transfer the same from one position to another, said support means comprising releasable clamping means operable for clamping and accurately aligning said main rod, and, respectively, releasing said main rod for displacement therof along the longitudinal direction with play, wherein said clamping means comprises a first fluid operable piston selectively operable to be clamped against the surface of the main rod and a second fluid operable piston to be selectively operable for clamping a guide rod in a fixed position simultaneously with said first piston.

3. A loading arm apparatus comprising a main rod, support means operable for supporting said rod displaceably along the longitudinal direction thereof, said rod including engaging means operative for engaging work pieces to transfer the same from one position to another, said support means comprising releasable clamping means operable for clamping and accurately aligning said main rod, and, respectively, releasing said main rod for displacement thereof along the longitudinal direction with play, wherein said clamping means comprise at least one stationary clamping and aligning block, and further comprising a guide rod disposed in said clamping and aligning block and clampable together with said main rod by said clamping means, said clamping and aligning block being disposed near one end of said main rod, whereby said main rod is restrained from being rotated upon said guide rod being clamped by said clamping means.

4. A loading arm apparatus comprising a main rod displaceable along the longitudinal direction thereof, gripping means disposed at one end of said main rod and adapted for gripping work pieces and transferring same from one position to another position, means for clamping and accurately aligning said main rod when displaced along the longitudinal direction, the clamping and aligning means comprising a first fluid-operable piston selectively operable to be clamped against the surface of the main rod, and a second fluid-operable piston selectively operable for clamping a guide rod in a fixed position simultaneously with said first piston, and supporting means for said main rod permitting a relatively large play for said main rod during the displacement thereof.

* * * * *